United States Patent
Scott, III et al.

(10) Patent No.: US 7,849,233 B2
(45) Date of Patent: *Dec. 7, 2010

(54) GESTURE-BASED CHARACTER INPUT

(75) Inventors: Samuel Thomas Scott, III, Los Gatos, CA (US); James Armand Baldwin, Redwood City, CA (US); Elizabeth Rose McEnroe, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/189,731

(22) Filed: Aug. 11, 2008

(65) Prior Publication Data

US 2009/0043915 A1 Feb. 12, 2009

Related U.S. Application Data

(63) Continuation of application No. 11/141,358, filed on May 31, 2005, now Pat. No. 7,412,441.

(51) Int. Cl.
*G06F 3/00* (2006.01)
(52) U.S. Cl. .............................. 710/8; 345/26; 345/468
(58) Field of Classification Search ...................... 710/8; 341/22
See application file for complete search history.

(56) References Cited

U.S. PATENT DOCUMENTS

| | | | |
|---|---|---|---|
| 4,674,066 A | 6/1987 | Kucera | |
| 5,937,041 A | 8/1999 | Cardillo, IV et al. | |
| 5,982,303 A * | 11/1999 | Smith | 341/22 |
| 6,018,736 A | 1/2000 | Gilai et al. | |
| 6,285,683 B1 | 9/2001 | Lin | |
| 6,381,598 B1 | 4/2002 | Williamowski et al. | |
| 6,718,015 B1 | 4/2004 | Berstis | |
| 6,731,803 B1 * | 5/2004 | Aharonson et al. | 382/187 |
| 6,753,794 B1 * | 6/2004 | Adams | 341/22 |
| 6,850,949 B2 | 2/2005 | Warner et al. | |
| 6,952,597 B2 * | 10/2005 | Graham et al. | 455/566 |
| 6,976,019 B2 | 12/2005 | Davallou | |
| 7,046,185 B2 * | 5/2006 | Griesau et al. | 341/176 |
| 7,095,403 B2 | 8/2006 | Lyustin et al. | |
| 7,096,179 B2 | 8/2006 | Zhu et al. | |
| 7,111,056 B1 | 9/2006 | Ramey et al. | |
| 7,155,683 B1 * | 12/2006 | Williams | 715/816 |
| 2003/0036411 A1 * | 2/2003 | Kraft | 455/566 |
| 2005/0114312 A1 | 5/2005 | Mosescu | |
| 2006/0048190 A1 | 3/2006 | Aoki et al. | |

* cited by examiner

*Primary Examiner*—Henry W Tsai
*Assistant Examiner*—Elias Mamo
(74) *Attorney, Agent, or Firm*—Lee & Hayes, PLLC (57) ABSTRACT

Gesture-based character input is described. A user inputs a character by selecting keys on a keypad device via a gesture representing the shape of the character. The sequence of keys selected by the user is interpreted to represent a specific character.

20 Claims, 9 Drawing Sheets

GESTURE-BASED CHARACTER INPUT

PRIORITY

This application is a divisional of prior pending U.S. patent application Ser. No. 11/141,358, filed on May 31, 2005, which is herein incorporated by reference in its entirety, and priority is claimed to this application. Any disclaimer that may have occurred during the prosecution of the above-referenced application is hereby expressly rescinded, and reconsideration of all relevant art is respectfully requested.

BACKGROUND

A television remote control and some portable electronic devices, such as a cell phone, are difficult to use for text-based searching with current text input methods, particularly due to the limited set of input keys available on such devices. For example, other than the various configuration and television-specific input keys, a television remote control only has a standard numeric input keypad that includes the numbers zero through nine to input a channel selection. A viewer cannot easily input letters for a text search in an electronic program guide to search for a specific program, music, television content, or various other applications that may be available via the viewer's cable provider or other television system content provider. Further, conventional text searching techniques require that a user-entered search term be spelled correctly to locate the desired term.

Other electronic devices, such as a cell phone for example, are typically equipped with a conventional alphanumeric input keypad that includes the numbers zero through nine along with the alphabetic characters "A" to "Z". Although zero (0) through nine (9) is a total of ten input keys, an alphanumeric or numeric input keypad is commonly referred to as a "9-key" keypad. The letters on a "9-key" keypad are distributed along with the numbers two (2) through nine (9). For example, the number two (2) includes the letters "A", "B", and "C", the number three (3) includes the letters "D", "E", and "F", and so on with each consecutive number being associated with the next consecutive three letters. The letters "Q" and "Z" may not be included on some keypads, but if they are, the number seven (7) has four associated letters to include "Q" and the number nine (9) has four associated letters to include "Z".

There are techniques available to enter text with an alphanumeric "9-key" keypad, however they are cumbersome and in some cases, can require more user inputs than would actually be required to input a text string for the word itself, such as with a computer keyboard. For example, multi-tapping (also referred to as triple tap) is a technique to enter text and/or letters with a "9-key" keypad, such as with a cell phone to create a text message. As described above, the letters "A", "B", and "C" are associated with the number two (2) input key on the keypad. Pressing the input key once enters an "A", twice enters a "B", three times enters a "C", and four times enters a "4". Spelling out even short words for a text input can require multiple key entries. For example, to spell out "CAB", a user would have to press the number two (2) input key a total of six times—three more inputs than would even be necessary with a conventional keyboard.

An alternative text-entry technique is "T9" ("text on nine keys") which selects a letter that is associated with a key input to spell a word correctly based on a likelihood of letter combinations. With "T9", a user may only have to press an input key once rather than multiple times as with multi-tapping. For example, to again spell out "CAB", a user would only have to press the number two (2) input key a total of three times (once for "C", twice for "CC", and a third time for "CAB"). The "T9" technique is not without its limitations however. Depending on the presumed likely letter combinations, a user may have to switch back to multi-tapping to create a word that "T9" does not recognize, or the user may have to input several "T9" key combinations to create the word.

Irrespective of the technique implemented to enter text with an alphanumeric "9-key" keypad, the conventional text input techniques are cumbersome, often require more key inputs than would otherwise be necessary, and/or require unnatural combinations of key inputs.

SUMMARY

Gesture based character input is described herein.

In an embodiment of gesture based character input, a character shape is input on a keypad device, via selection of a sequence of keys. The character is determined based upon the shape of the character as represented by the selected sequence of keys. Characters derived from multiple key sequences are assembled to create character strings.

In an embodiment each character in a string of characters is represented by a numeric equivalent of the character.

BRIEF DESCRIPTION OF THE DRAWINGS

The same numbers are used throughout the drawings to reference like features and components.

DETAILED DESCRIPTION

Predictive phonetic data search is described in which embodiments provide for improved text searching techniques with a restrictive input device, such as a television remote control, cell phone, or other similar devices that have a conventional "9-key" numeric or alphanumeric input keypad. A user can input a search request to locate a term, such as a particular television program, music channel, network-based application, and the like, where a search "term" can be any form of text, letters, a word, a group of words, and/or any combination of characters and numbers. A numeric index includes a number that matches a numerical equivalent of the term designated in the search request. The numeric index also includes numerical equivalent(s) that correspond to translations of the term and phonetic equivalents of the term so that the term designated in the search request does not have to be spelled correctly when input to locate the search term.

When a numeric equivalent that corresponds to the search term is located in the numeric index, the search term can be obtained from a term index that is mapped to the numeric equivalent(s) which correspond to the search term and/or translations and phonetic equivalents of the search term. The search term can then be returned in response to the search request. For example, the requested search term may be displayed in an electronic program guide on a television that also displays programming information corresponding to the search term, such as for a particular television program. By pre-computing a numeric equivalent for the search term and for the possible translations and/or phonetic equivalents of the search term, the search-and-match process can be executed faster than conventional text-based searching to match the actual characters of a search term.

The terms that are maintained in the term index, and from which the numeric equivalents are determined, are received and identified from any number of text data sources, such as electronic program guide data and/or closed captions data corresponding to television content. The numeric equivalents of each term, the translations of the term, and/or the phonetic equivalents of the term are computed and maintained in the numeric index which can be searched for a requested search term. Each numeric equivalent in the numeric index is mapped to the corresponding search term in the term index such that when a numeric equivalent of the particular search term is located in the numeric index, the corresponding search term in the term index can be returned in response to a search request. This provides that a user need only enter a phonetic equivalent of a term that can be misspelled or does not include all of the letters and/or numbers of the term to minimize the number of keypad inputs, yet still receive a correct response to the search request. Further, the user can enter the search term in one language and receive a response to the search request in another language.

While aspects of the described systems and methods for predictive phonetic data search can be implemented in any number of different computing systems, environments, television-based entertainment systems, and/or configurations, embodiments of predictive phonetic data search are described in the context of the following exemplary system architectures.

Figure 1:
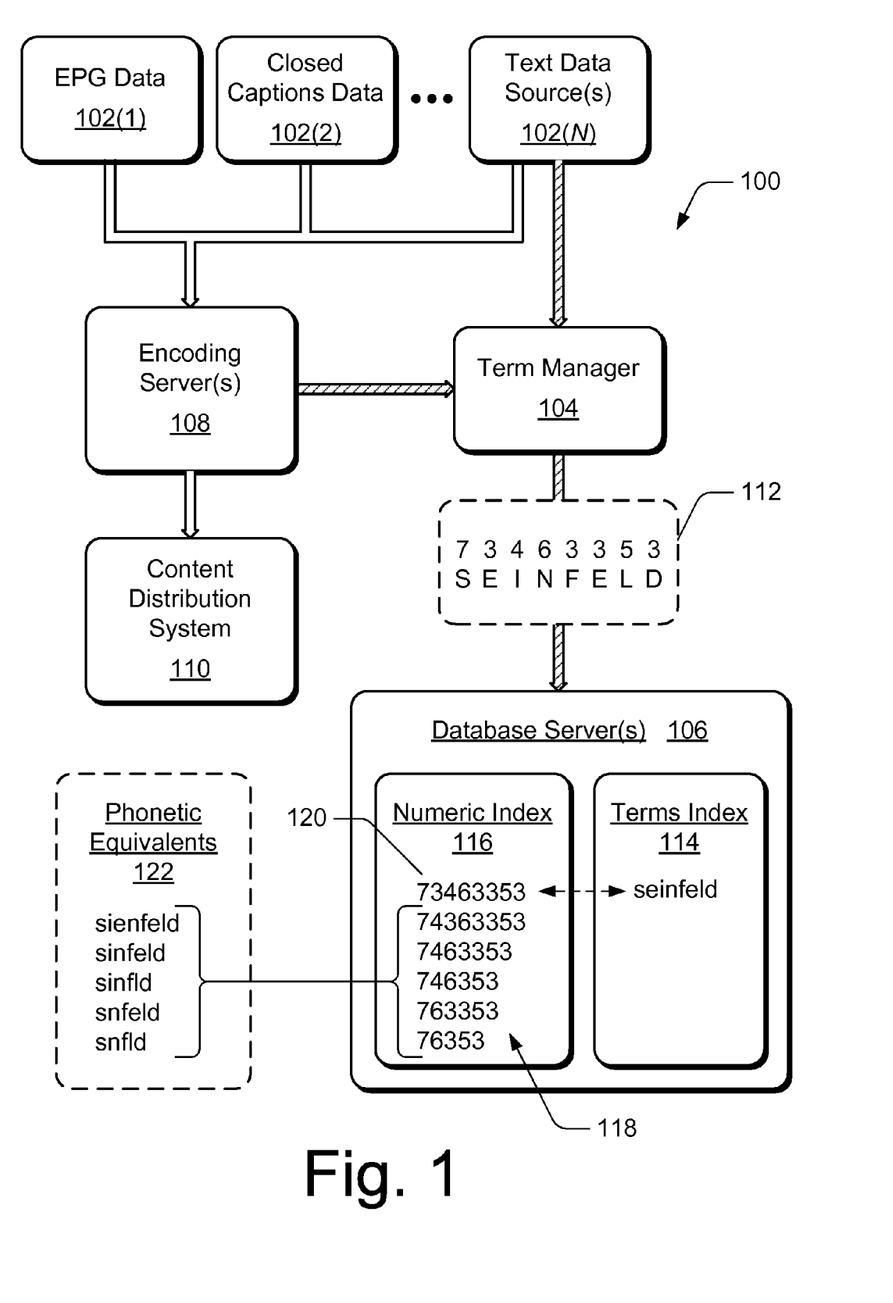
FIG. 1 illustrates an exemplary data search system in which embodiments of predictive phonetic data search can be implemented.

FIG. 1 illustrates an exemplary data search system 100 in which embodiments of predictive phonetic data search can be implemented. In this example, the system 100 includes text data sources 102(1-N), a term manager 104, and database server(s) 106. In this example, the text data sources 102(1-1V) include electronic program guide data 102(1), closed captions data 102(2), and/or any text data from various sources 102(N). The text data sources 102(1-N) may also include purchased metadata and/or data that has been edited or translated by hired personnel. In a television-based environment, the system 100 also includes encoding server(s) 108 and a content distribution system 110. The encoding server(s) 108 can be implemented to receive and process the text data received from the text data sources 102(1-N) for distribution to client devices via the content distribution system 106. An exemplary television-based system 900 that includes client devices is described further with reference to FIG. 9.

The term manager 104 can be implemented to receive the text data from the encoding server(s) 108 and/or directly from the various text data sources 102(1-N) themselves. The term manager 104 identifies terms in the text data that may be requested in a search and computes a numeric equivalent of each term. For example, the term manager 104 identifies the term "Seinfeld" from the popular television comedy series in either the electronic program data 102(1) or in the closed captions data 102(2). The term manager 104 then computes a numeric equivalent 112 of the term.

Figure 2:
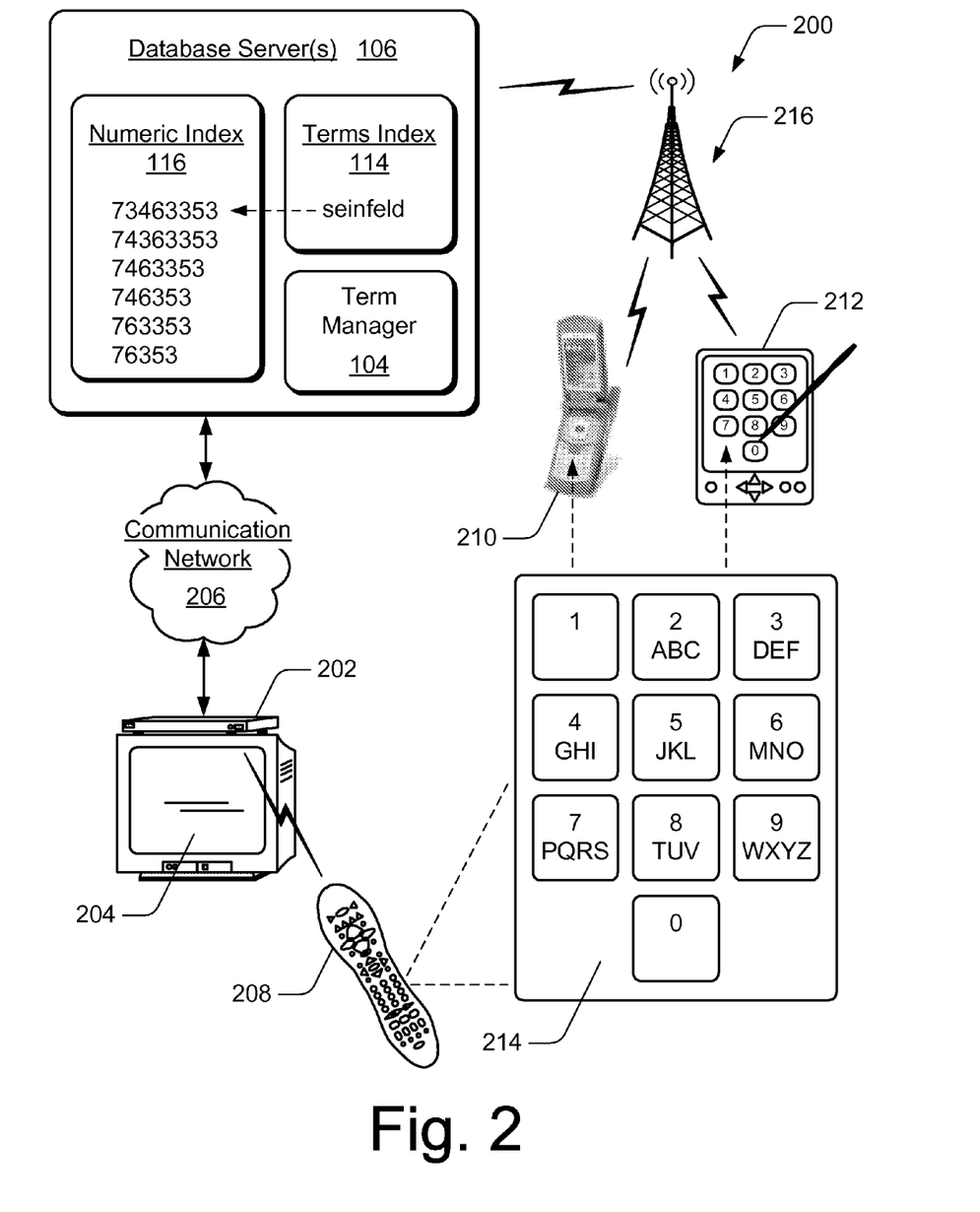
FIG. 2 illustrates an exemplary data search system in which embodiments of predictive phonetic data search can be implemented.

On an alphanumeric keypad, an example of which is shown in FIG. 2, "S" is associated with the seven (7) input key, "E" is associated with the three (3) input key, "I" is associated with the four (4) input key, "N" is associated with the six (6) input key, "F" is associated with the three (3) input key, "E" is associated with the three (3) input key, "L" is associated with the five (5) input key, and "D" is associated with the three (3) input key. As such, the numeric equivalent 112 of the data text term "Seinfeld" is 73463353. It should be noted that the techniques described herein are equally applicable for terms that include capital letters, small letters, and any combination thereof.

The database server(s) 106 include a terms index 114 and a numeric index 116, which in an embodiment, are any form of computer readable media that can store and maintain data. The terms index 114 maintains the terms identified by the term manager 104 in the text data received from the text data sources 102(1-1V). For example, the terms index 114 includes the term "Seinfeld" which a user may search for via an electronic program guide to find and watch an episode of the television program. The numeric index 116 maintains the numeric equivalent(s) 118 of each of the data text terms maintained in the terms index 114. For example, the numeric equivalent 112 (i.e., 73463353) of "Seinfeld" is maintained in the numeric index 116 as the first listed numeric equivalent 120. The numeric equivalent 120 in the numeric index 116 is mapped to the corresponding term "Seinfeld" in the terms index 114 such that when a numeric equivalent of a particular search term is located in the numeric index 116, the corresponding search term in the term index 114 can be returned in response to a search request.

The term manager 104 also computes the additional numeric equivalents 118 that each correspond to a phonetic equivalent 122 of the term. The additional numeric equivalents 118 are also maintained in the numeric index 116 and are mapped to the corresponding term in the terms index 114. The additional numeric equivalents correspond to phonetic equivalents of a particular term in the term index 114 and may be a misspelling of the term, a spelling of the term that includes only consonants and no vowels, and/or a number in place of a word in the term.

For example, the first numeric equivalent 118 that is listed (i.e., 74363353) corresponds to a misspelling of the term "Seinfeld" where a user may input the search term, but misspell the word as "Sienfeld" with an "i" before the "e". The last numeric equivalent 118 that is listed (i.e., 76353) corresponds to a spelling of the term "Seinfeld" that includes only the consonants of the word "snfld", and none of the vowels. As such, a user can search for the television show, yet only provide a minimal input with a restrictive input device, such as a television remote control, cell phone, or other similar devices that have a conventional "9-key" numeric or alphanumeric input keypad.

In another example, a user can input search terms where a number is input in place of a word in the search term. For example, a user can search for the television program "Deep Space Nine" by inputting a search for "Deep Space 9", or as described above "DPSC9" (or by various other letter and number combinations). For another example, a user can search for the television program "Eight is Enough" by inputting a search for "8 is Enough", or as described above "8ENUF" (or by various other letter and number combinations). It should be noted that the phonetic equivalents 122 shown in FIG. 2 are merely illustrative, and do not need to be maintained or stored in memory, thus saving memory space.

Only the numeric equivalents 118 need be maintained such that the term manager 104 can receive a search input, determine the numerical equivalent of the search input, and then locate the number in the numeric index 116 that corresponds to the numeric equivalent of the search input. For example a user may search for "Star Trek" episodes and enter six (6) keypad inputs for "STRTRK" which the term manager 104 determines to have a numerical equivalent of 787875. Rather than searching for the actual text string of "S,T,R,T,R,K", the term manager searches the numeric index 116 for "787875", and when the number is located, obtains "Star Trek" from the terms index 114 to which the number is mapped.

FIG. 2 illustrates an exemplary data search system 200 in which embodiments of predictive phonetic data search can be implemented. The system 200 includes the database server(s) 106 shown in FIG. 1, and in this example, the term manager 104 is shown as a component of a database server 106 to implement the various embodiments of predictive phonetic data search described herein. The system 200 also includes an exemplary television-based client device 202 that receives program content, program guide data, advertising content, closed captions data, and the like for display on a display device 204 (e.g., a television) via a communication network 206, such as the content distribution system 110 shown in FIG. 1. In an embodiment, client device 202 can be implemented with any combination of components described with reference to the exemplary electronic and/or computing device 800 shown in FIG. 8. Further, an exemplary television-based system 900 is described further with reference to FIG. 9.

A user can input a search request to locate a term, such as a particular television program, music channel, network-based application, and the like with a restrictive input device, such as a television remote control 208, a cellular phone 210, or a PDA 212 that only has a "9-Key" alphanumeric keypad 214. A search term can be any form of text, letters, a word, a group of words, and/or any combination of characters and numbers. For example, the user may input a search request in an electronic program guide displayed on the display device 204 via the client device 202 with the television remote control 208. Alternatively, (although not shown) a user may input a search request to the client device 202 via the cellular phone 210 and/or the PDA 212 which may be configured to operate as a television remote control device.

A user may also input a search request with the cellular phone 210 and/or the PDA 212 via a wired or wireless connection 216 that is received by the term manager 104. The user can input the search request with the "9-Key" alphanumeric keypad 214 on the cellular phone 210 or PDA 212 and have the requested term returned for display on a display component of the cellular phone 210 or PDA 212. For example, a user may want to search for an upcoming broadcast of a "Seinfeld" episode, and then have the associated programming information displayed via the cellular phone 210 or PDA 212 so that the user will know what time to be home to watch the television program. Although the examples described herein pertain to searching for the "title" of a program, such as "Seinfeld", a requested search can include any terms that may be associated with a program, movie, gaming application, music, and the like. For example, a user may search for a particular actor, director, singer, or any other criteria or category of data that can be searched to locate a requested term.

A user can enter a search term via a numeric or alphanumeric keypad, such as the "9-Key" alphanumeric keypad 214, on the television remote control 208, cellular phone 210, or PDA 212 as any one of: a sequence of characters, a sequence of letters each associated with a channel number input key on the keypad of the television remote control 208, as a sequence of letters each associated with a telephone number input key entered on a keypad of the cellular phone 210, as a text-based input that includes a sequence of characters that correspond to two or more words, as a combination of alphabetic character(s) and numeric character(s), as a phonetic equivalent of the term, as the phonetic equivalent which is a misspelling of the term, as the phonetic equivalent which includes only consonants in the term and no vowels, as the phonetic equivalent that includes a number in place of a word in the term, and/or any combination thereof. This list of search term inputs is not intended to be all-inclusive, but to merely illustrate some of the possible inputs that may be used to minimize the number of keypad entries needed when searching text data with a restrictive input device.

As described, a requested search term can be returned for display via an electronic program guide displayed on display device 204 (e.g., a television), or the requested search term can be displayed on a display component of the cellular phone 210 or PDA 212. Additionally, a requested search term may return multiple listings or results which can all be displayed for the requesting user. For example, a search for a program listing or television program may return several instances of upcoming scheduled broadcasts of the program. Although an on-demand movie or gaming application does not have a typical broadcast schedule, the information returned for display may include when the on-demand content will become available to order, the associated cost, and/or any other similar information. The information returned for display in response to a requested search term may also be annotated based on a popularity of the results, to identify which of the returned search terms are already designated to be recorded (for a television program, for example), and/or any other annotations associated with the information returned for display.

In another embodiment of predictive phonetic data search, a user can enter a search term in one language with the "9-Key" alphanumeric keypad 214 on the cellular phone 210 or PDA 212 and have the requested term returned for display in another language. For example, a user may want to determine if the movie "Tres Amigos", which is titled in Spanish, is available for viewing. The user may then enter a search request in English as any one of "3 Friends", "3friends", or "3FRNDS" (just for examples) to locate programming information associated with the movie. Optionally, a user may configure a preference such that a response to a request entered in any language is returned in a specified language, such as Spanish. For example, if an English-speaking user is traveling in Mexico, the user can enter a search term in English on the "9-Key" alphanumeric keypad 214 on the cellular phone 210 or PDA 212 and have the requested term displayed in Spanish on a display component of the cellular phone 210 or PDA 212.

Figure 3:
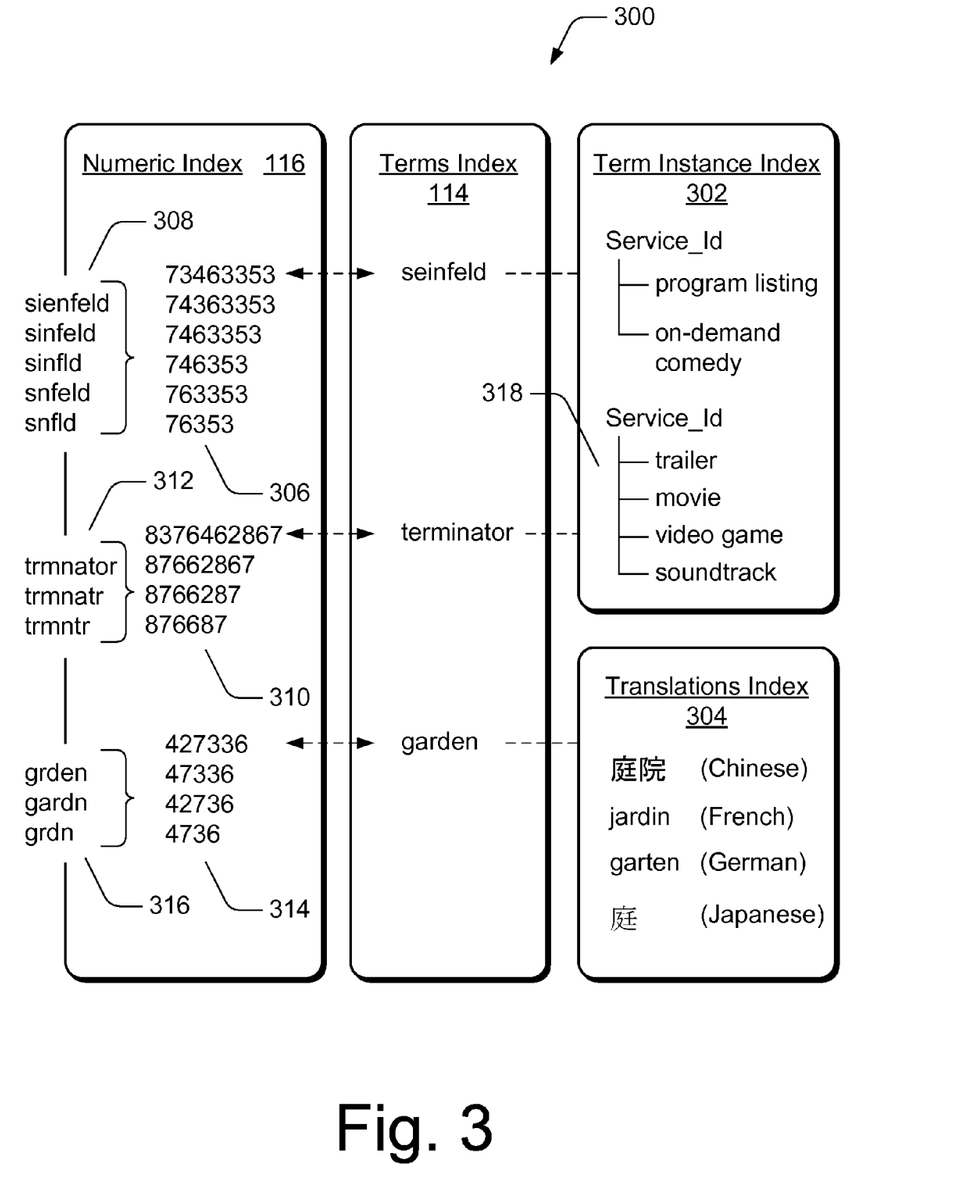
FIG. 3 illustrates exemplary database components of the data search systems shown in FIGS. 1 and 2.

FIG. 3 illustrates exemplary database components 300 that can be implemented as part of the data search systems shown in FIGS. 1 and 2, and which can be implemented in embodiments of predictive phonetic data search. The database components 300 include the terms index 114 and the numeric index 116 described with reference to FIG. 1. The database components 300 also include a term instance index 302 and a translations index 304.

In this example, the terms index 114 includes the illustrative terms "seinfeld", "terminator", and "garden" which may be requested in a search by a user. As described above with reference to FIG. 1, a term in the terms index 114 corresponds to numeric equivalents in the numeric index 116. For example, numeric equivalents 306 include the numeric equivalent 73463353 that corresponds to the keypad inputs for the term "seinfeld", and includes numeric equivalents of various phonetic equivalents 308 of the term "seinfeld". The numeric equivalents 306 in the numeric index 116 are mapped to the term "seinfeld" in the terms index 114.

Similarly, the numeric equivalents 310 include the numeric equivalent 8376462867 that corresponds to the keypad inputs for the term "terminator", and includes numeric equivalents of various phonetic equivalents 312 of the term "terminator". The numeric equivalents 310 in the numeric index 116 are mapped to the term "terminator" in the terms index 114. Similarly, the numeric equivalents 314 include the numeric equivalent 427336 that corresponds to the keypad inputs for the term "garden", and includes numeric equivalents of various phonetic equivalents 316 of the term "garden". The numeric equivalents 314 in the numeric index 116 are mapped to the term "garden" in the terms index 114. It should be noted that the phonetic equivalents 308, 312, and 316 shown in FIG. 3 are merely illustrative to show the derivation of the respective numeric equivalents 306, 310, and 314.

The translations index 304 includes translations of the term "garden" which are mapped to the term "garden" in the terms index 114. When a user requests a translation of the term "garden" and a numeric equivalent 314 of the search term is located in the numeric index 116, a translation of the search term can be returned in response to the search request. For example, a user in China may enter a search request for "GRDN" on the keypad of a cellular phone or PDA (or other portable electronic device) which is a phonetic equivalent 316 that is determined to have a numerical equivalent 314 of 4736. The numerical equivalent 314 in the numeric index 116 can be mapped back to the term "garden" in the terms index 114, and the term "garden" can be mapped to the Chinese translation aM of the term in the translations index 304. Although translations are only shown for the term "garden" in the translations index 304 in this example, each of the terms in the terms index 114 may have translations included in the translations index 304.

The term instance index 302 includes service identifiers (i.e., a "Service_Id") that each correspond to a term in the terms index 114. A service identifier includes term instances that define how content associated with a term is presented for use by a user if a user selects the term from displayed results. For example, the term "terminator" in the terms index 114 can be returned in response to a user initiated search request and displayed as options for user selection. In this example, the options may correspond to a broadcast of the movie "Terminator", on-demand availability of the movie, a trailer of the movie, a video game based on the movie, or a soundtrack of the movie.

The term instances 318 corresponding to the "terminator" term indicate that if the user selects to view the trailer of the movie, then the trailer will be received at the user's client device for viewing. Similarly, if the user selects to watch a broadcast of the movie, or orders the movie from an on-demand service, the user's client device will be tuned to receive the broadcast or on-demand presentation of the movie. Alternatively, if the viewer selects the video game option, the video game can also be rendered from an on-demand service and/or an offer to purchase the video game can be displayed for the user. If the user selects the soundtrack option, then the music corresponding to the movie can be streamed to the user's client device such that the user can listen to the soundtrack.

Figure 4:
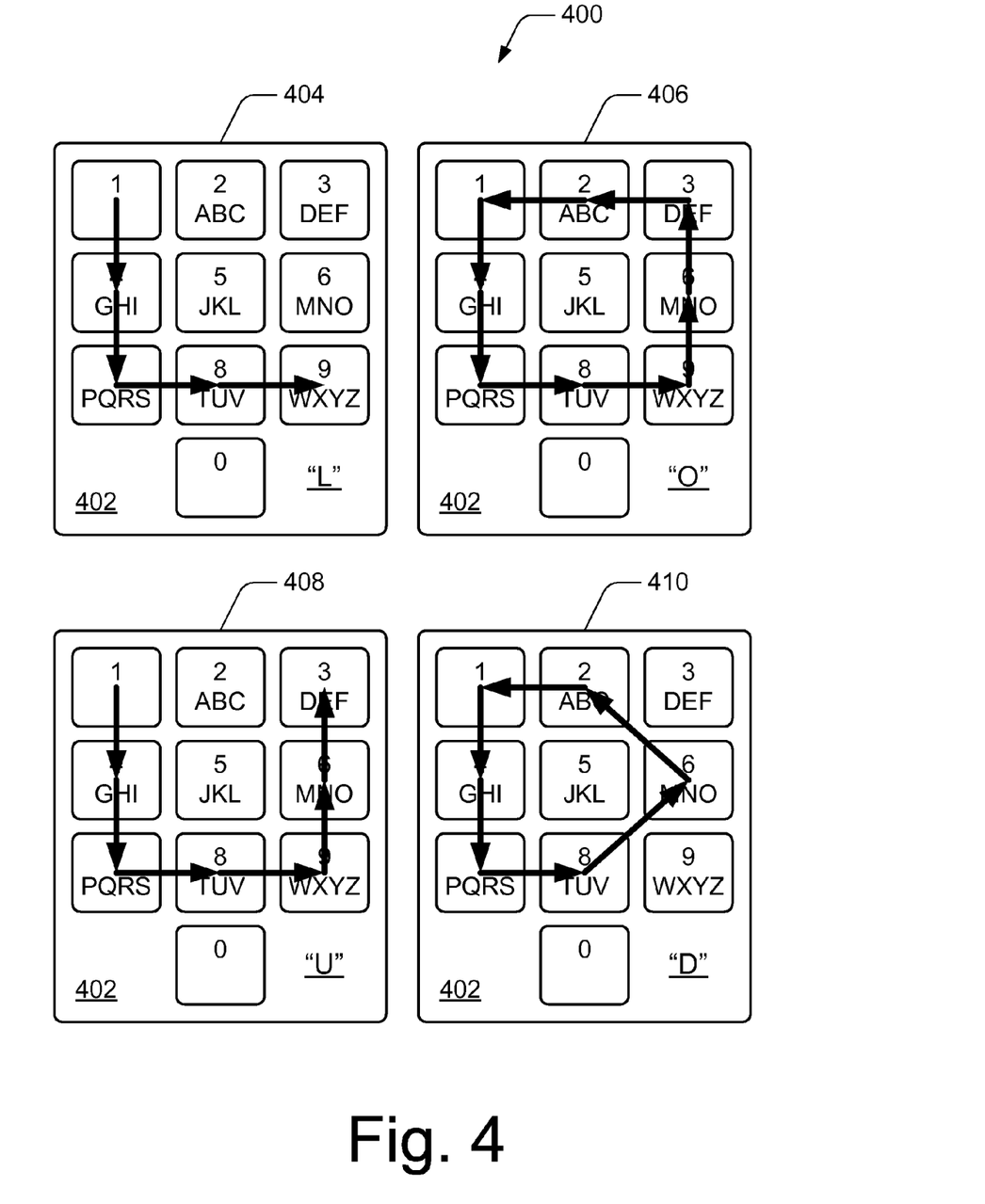
FIG. 4 illustrates a shape-based search input initiated with a keypad to implement a predictive phonetic data search.

FIG. 4 illustrates an example of a search request that is input as a shape-based search request 400 using a "9-Key" alphanumeric keypad 402 to implement a predictive phonetic data search. In this example, a user inputs a request for a search term "LOUD" and inputs each letter of the term with shape-based pattern movements over the keypad such that the keypad is being utilized as a touch pad. For example, to enter the "L" input of the term at 404, a user can form an L-shape with keypad entries in a sequence of the one (1) key, four (4) key, seven (7) key, eight (8) key, and nine (9) key.

Similarly, to enter the "0" input of the term at 406, a user can form an 0-shape with keypad entries in a sequence of the one (1) key, four (4) key, seven (7) key, eight (8) key, nine (9) key, six (6) key, three (3) key, two (2) key, and one (1) key. To enter the "U" input of the term at 408, a user can form a U-shape with keypad entries in a sequence of the one (1) key, four (4) key, seven (7) key, eight (8) key, nine (9) key, six (6) key, and three (3) key. To enter the "D" input of the term at 410, a user can form a D-shape with keypad entries in a sequence of the one (1) key, four (4) key, seven (7) key, eight (8) key, six (6) key, two (2) key, and one (1) key.

The term manager 104 (as described with reference to FIG. 1) can be implemented to receive the key entry sequences that each correspond to a letter of the requested search term, and determine each of the letters. The term manager 104 can then determine the numerical equivalent of the search input to be 5683 (i.e., the single key inputs for the term "LOUD"), and then locate the number in the numeric index 116 that corresponds to the numeric equivalent of the search term input.

Methods for predictive phonetic data search, such as exemplary methods 500-700 described with reference to respective FIGS. 5, 6, and 7, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
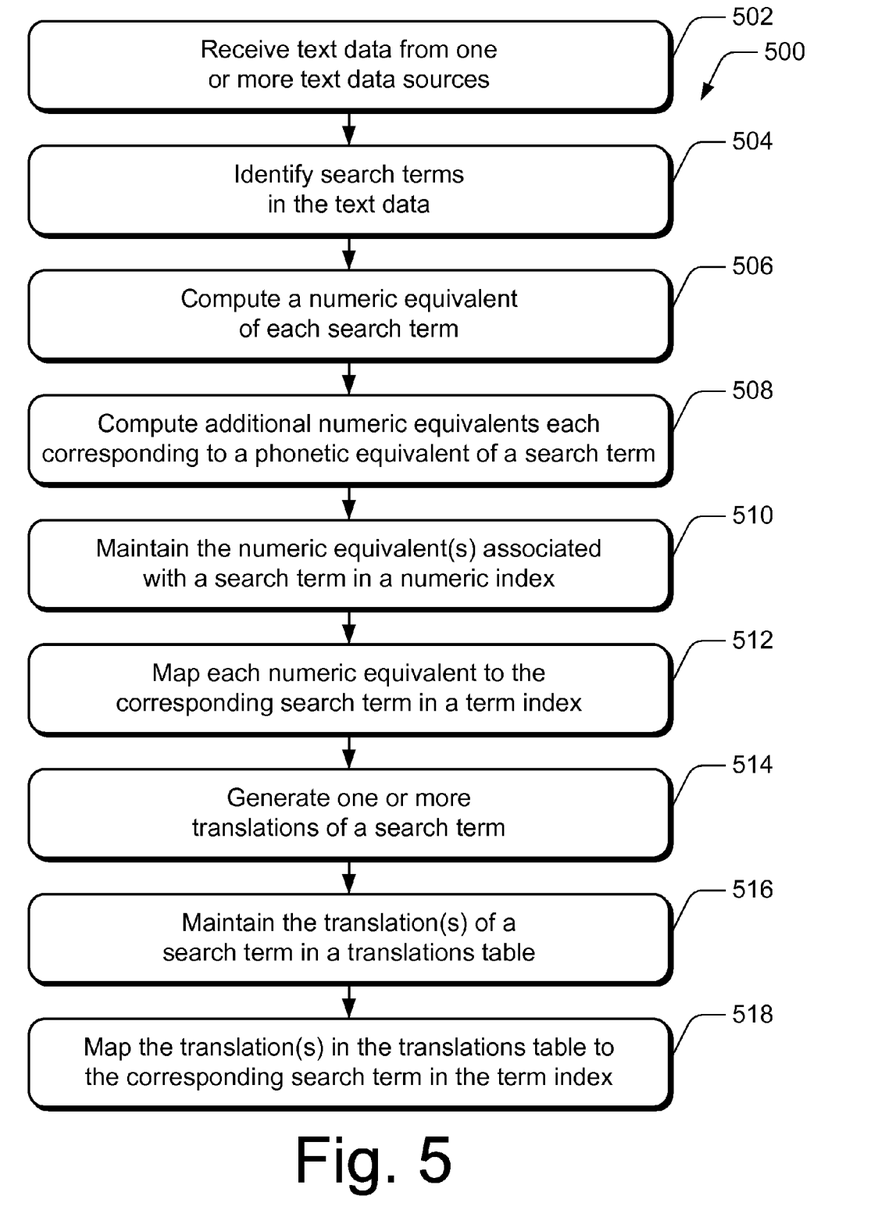
FIG. 5 illustrates an exemplary method for predictive phonetic data search and is described with reference to generating search terms and numeric equivalents.

FIG. 5 illustrates an exemplary method 500 for predictive phonetic data search, and is described with reference to generating search terms and numeric equivalents. The order in which the method is described is not intended to be construed as a limitation, and any number of the described method blocks can be combined in any order to implement the method. Furthermore, the method can be implemented in any suitable hardware, software, firmware, or combination thereof.

At block 502, text data is received from one or more text data sources. For example, text data can be received from text data source(s) 102(1-1V) (FIG. 1) which can include electronic program guide data 102(1), closed captions data that corresponds to television content 102(2), and/or any other text data source 102(M. At block 504, search terms are identified in the text data. For example, the term manager 104 can identify terms in the received text data that may be requested by a user in a search At block 506, a numeric equivalent of each search term is computed. For example, the term manager 104 computes a numeric equivalent 112 of the requested search term. At block 508, additional numeric equivalents each corresponding to a phonetic equivalent of a search term are computed. For example, the term manager also computes additional numeric equivalents 118 that each correspond to a phonetic equivalent 122 of the requested search term. A phonetic equivalent of a search term can be a misspelling of the search term, a spelling of the search term that includes only consonants and no vowels, and/or a number in place of a word in the search term. The additional numeric equivalents are computed for any one or more of the phonetic equivalents.

At block 510, the numeric equivalent(s) associated with each search term are maintained in a numeric index. For example, the numeric equivalent(s) 118 are maintained in the numeric index 116 and include the numeric equivalent 120 corresponding to the correct spelling of the search term as well as the additional numeric equivalents 118 that each correspond to a phonetic equivalent 122 of the search term. The numeric equivalent(s) 118 can be searched in response to a search request for a particular search term.

At block 512, each numeric equivalent in the numeric index is mapped to the corresponding search term in a term index. For example, the numeric equivalents 118 corresponding to the requested search term in the numeric index 116 are mapped to the terms maintained in the terms index 114 such that when a numeric equivalent of a requested search term is located in the numeric index 116, the corresponding search term in the term index 114 can be returned in response to a search request.

At block 514, one or more translations of a search term are generated and, at block 516, the one or more translations of the search term are maintained in a translations index For example, the term manager 104 can generate translations of a term that are maintained in the translations index 304 (FIG. 3). At block 518, the one or more translations in the translations index are mapped to the corresponding search term in the term index. For example, the translations for the term "garden" in the translations index 304 are mapped to the term "garden" in the terms index 114 such that when the numeric equivalent of a requested search term is located in the numeric index, a translation of the search term can be returned in response to the search request.

Figure 6:
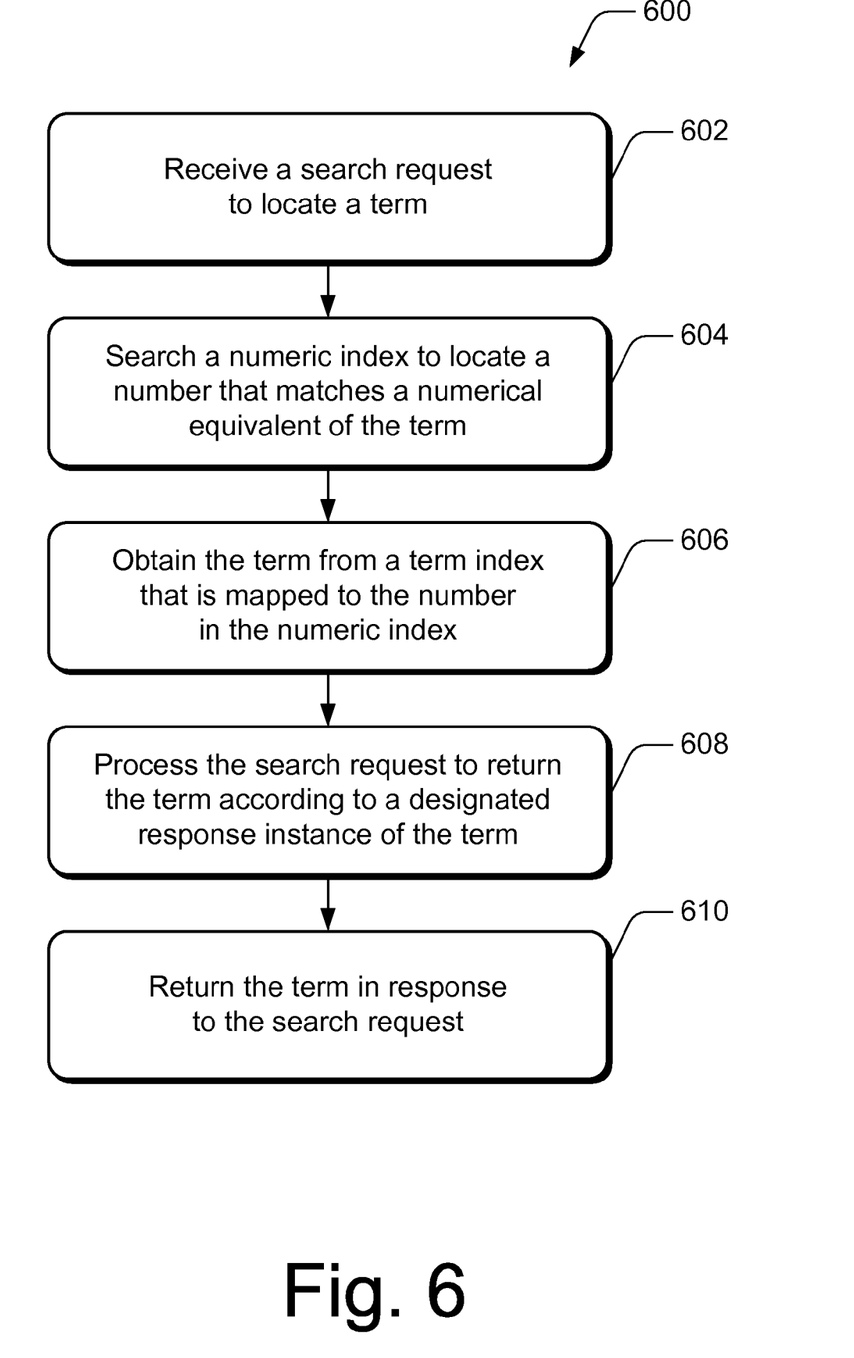
FIG. 6 illustrates an exemplary method for predictive phonetic data search and is described with reference to a search request for a particular search term.

FIG. 6 illustrates an exemplary method 600 for predictive phonetic data search, and is described with reference to a search request for a particular search term. The order in which the method is described is not intended to be construed as a limitation, and any number of the described method blocks can be combined in any order to implement the method. Furthermore, the method can be implemented in any suitable hardware, software, firmware, or combination thereof.

At block 602, a search request is received to locate a term. For example, the term manager 104 (FIG. 2) can receive a search request from a user for a particular term. A search request can be received as inputs to a restrictive input device, such as a television remote control 208, a cellular phone 210, or a PDA 212 that only has a "9-Key" alphanumeric keypad 214. A search request can be received as any one of: a sequence of characters, a sequence of letters each associated with a channel number input key on the keypad of the television remote control 208, as a sequence of letters each associated with a telephone number input key entered on a keypad of the cellular phone 210, as a text-based input that includes a sequence of characters that correspond to two or more words, as a combination of alphabetic character(s) and numeric character(s), as a phonetic equivalent of the term, as the phonetic equivalent which is a misspelling of the term, as the phonetic equivalent which includes only consonants in the term and no vowels, as the phonetic equivalent that includes a number in place of a word in the term, and/or any combination thereof.

At block 604, a numeric index is searched to locate a number that matches a numerical equivalent of the term. For example, the term manager 104 can search the numeric index 116 to locate a numeric equivalent 118 (FIG. 1) of a requested search term. At block 606, the term is obtained from a term index that is mapped to the number in the numeric index which matches the numerical equivalent of the term. For example, the numeric equivalent 118 of the search term is mapped to the term in the terms index 114.

At block 608, the search request is processed to return the term based on a designated response instance of the term. For example, the term manager 104 can return the requested term based on a designated term response instance 318 (FIG. 3) that corresponds to the 'term in the terms index 114. At block 610, the term is returned in response to the search request. For example, the requested term can be returned for display and according to the designated term response instance, as a translation of the term, as a list of likely terms that correspond to the term in response to the search request, or as any one of a program schedule, a broadcast television selection, an on-demand selection, or an application program.

Figure 7:
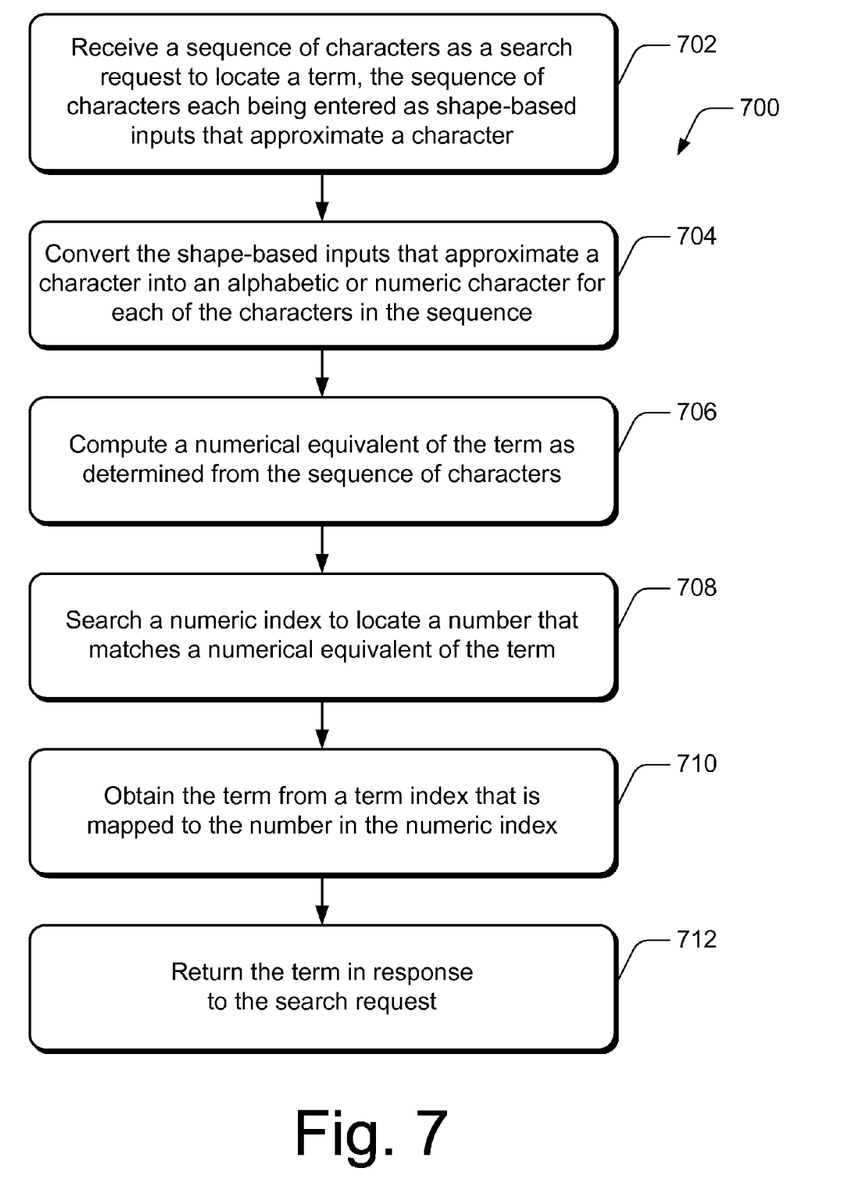
FIG. 7 illustrates an exemplary method for predictive phonetic data search and is described with reference to a search request initiated as a shape-based input on a keypad.

FIG. 7 illustrates an exemplary method 700 for predictive phonetic data search, and is described with reference to a search request initiated as a shape-based input on a keypad. The order in which the method is described is not intended to be construed as a limitation, and any number of the described method blocks can be combined in any order to implement the method. Furthermore, the method can be implemented in any suitable hardware, software, firmware, or combination thereof.

At block 702, a sequence of characters are received as a search request to locate a term, the sequence of characters each being entered as shape-based inputs that approximate a character. For example, a user can input a request for a search term by inputting each letter of the requested search term with shape-based pattern movements over a keypad 402 (FIG. 4) such that the keypad is being utilized as a touch pad. At block 704, the shape-based inputs that approximate a character are converted into at least one of an alphabetic or numeric character for each of the characters in the sequence. For example, the term manager 104 can receive the key entry sequences that each correspond to the letters "L,O,U,D" of the requested search term in the example 400, and determine each of the letters.

At block 706, a numerical equivalent of the term is computed as determined from the sequence of characters. At block 708, a numeric index is searched to locate a number that matches a numerical equivalent of the term. For example, the term manager 104 can then determine the numerical equivalent of the search input to be 5683 (i.e., the single key inputs for the term "LOUD" in FIG. 4), and then locate the number in the numeric index 116 that corresponds to the numeric equivalent of the search input. At block 710, the term is obtained from a term index that is mapped to the number in the numeric index which matches the numerical equivalent of the term. At block 712, the term is returned in response to the search request.

Figure 8:
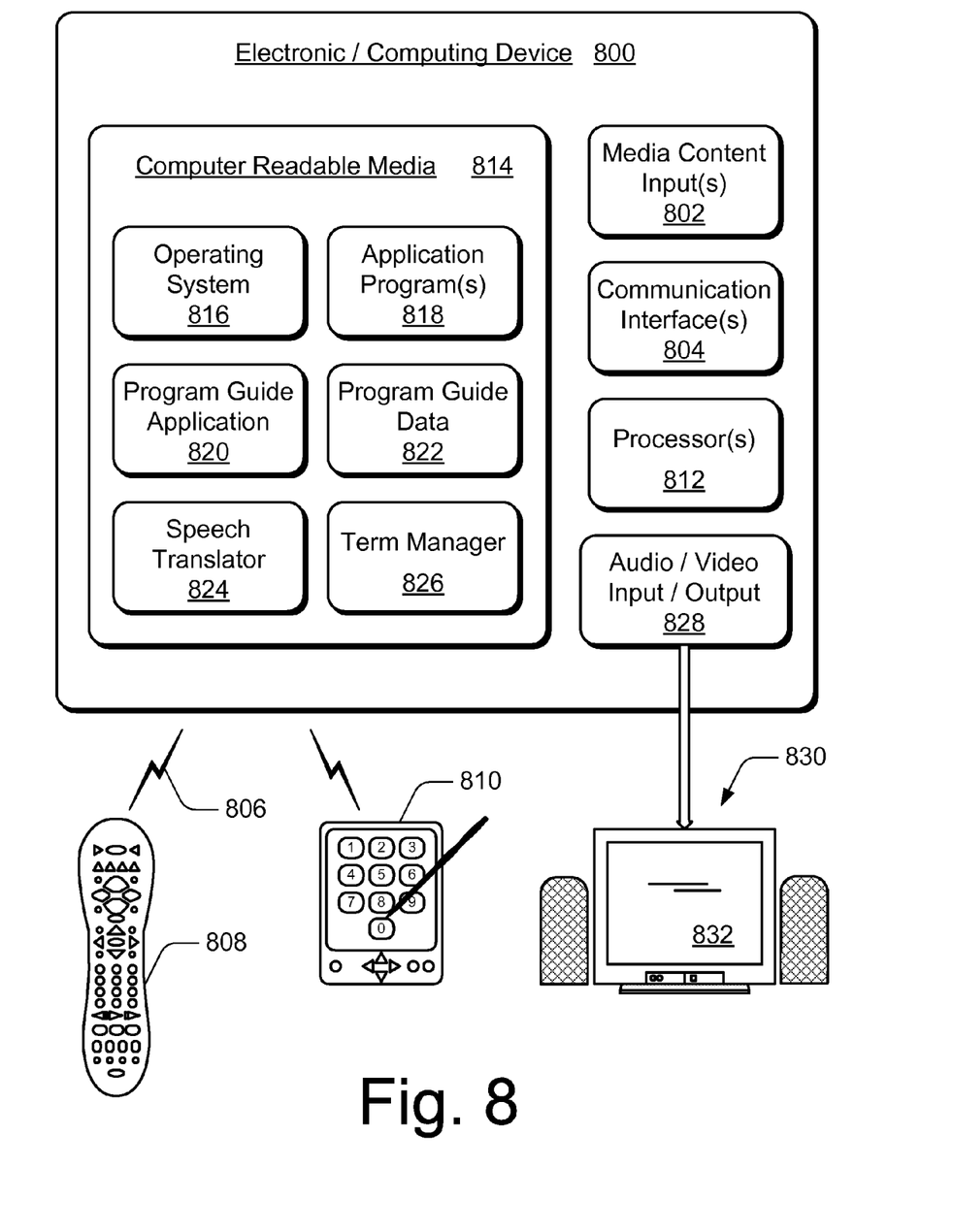
FIG. 8 illustrates various components of an exemplary electronic and/or computing device in which embodiments of predictive phonetic data search can be implemented.

FIG. 8 illustrates various components of an exemplary electronic and/or computing device 800 in which embodiments of predictive phonetic data search can be implemented. The electronic and/or computing device 800 can be implemented as any one or more of the electronic, computing, and client devices described herein, and as any one or more of the servers, monitors, and managers of the exemplary television-based system 900 described with reference to FIG. 9.

Electronic and/or computing device 800 includes one or more media content inputs 802 which may include Internet Protocol (IP) inputs over which streams of media content are received via an IP-based network. Device 800 further includes communication interface(s) 804 which can be implemented as any one or more of a serial and/or parallel interface, a wireless interface, any type of network interface, a modem, and as any other type of communication interface. A wireless interface enables device 800 to receive control input commands 806 and: other information from an input device, such as from remote control device 808, PDA (personal digital assistant) 810, cellular phonet or from another infrared (IR), 802.11, Bluetooth, or similar RF input device.

A network interface provides a connection between the computing and/or client device 800 and a communication network by which other electronic and computing devices can communicate data with device 800. Similarly, a serial and/or parallel interface provides for data communication directly between device 800 and the other electronic or computing devices. A modem facilitates device 800 communication with other electronic and computing devices via a conventional telephone line, a DSL connection, cable, and/or other type of connection.

Computing and/or client device 800 also includes one or more processors 812 (e.g., any of microprocessors, controllers, and the like) which process various computer executable instructions to control the operation of device 800, to communicate with other electronic and computing devices, and to implement embodiments of predictive phonetic data search. Device -800 can be implemented with computer readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 814 provides data storage mechanisms to store various information and/or data such as software applications and any other types of information and data related to operational aspects of the computing and/or client device 800. For example, an operating system 816 and/or other application programs 818 can be maintained as software applications with the computer readable media 814 and executed on processor(s) 812 to implement embodiments of predictive phonetic data search.

For example, device 800 can be implemented as a server and/or client device and the computer readable media 814 includes a program guide application 820 that is implemented to process program guide data 822 and generate program guides for display which enable a viewer to navigate through an onscreen display and locate broadcast programs, recorded programs, video on-demand programs and movies, interactive game selections, and other media access information or content of interest to the viewer. The computer readable media 814 can also includes a speech translator 824 and a term manager 826 to implement embodiments of predictive phonetic data search.

The speech translator 824 can be implemented to receive an audio input of a search term, such as from a microphone or other audio input device (e.g., via a communication interface 904), and convert the audio input into a search request to locate the requested term. The term manager 826 can implement the various features and aspects of predictive phonetic data search as described herein, such as described with reference to the methods 500-700 described with reference to respective FIGS. 5, 6, and 7. Although the term manager 826 is illustrated and described as a single application configured to implement embodiments of predictive phonetic data search, the term manager 826 can be implemented as several component applications distributed to each perform one or more functions in a server and/or client device in a television-based entertainment and information system.

The computing and/or client device 800 also includes an audio and/or video output 828 that provides audio and video to an audio rendering and/or display system 830, or to other devices that process, display, and/or otherwise render audio, video, and display data. Video signals and audio signals can be communicated from device 800 to a television 832 via an RF (radio frequency) link, S-video link, composite video link, component video link, analog audio connection, or other similar communication link.

Figure 9:
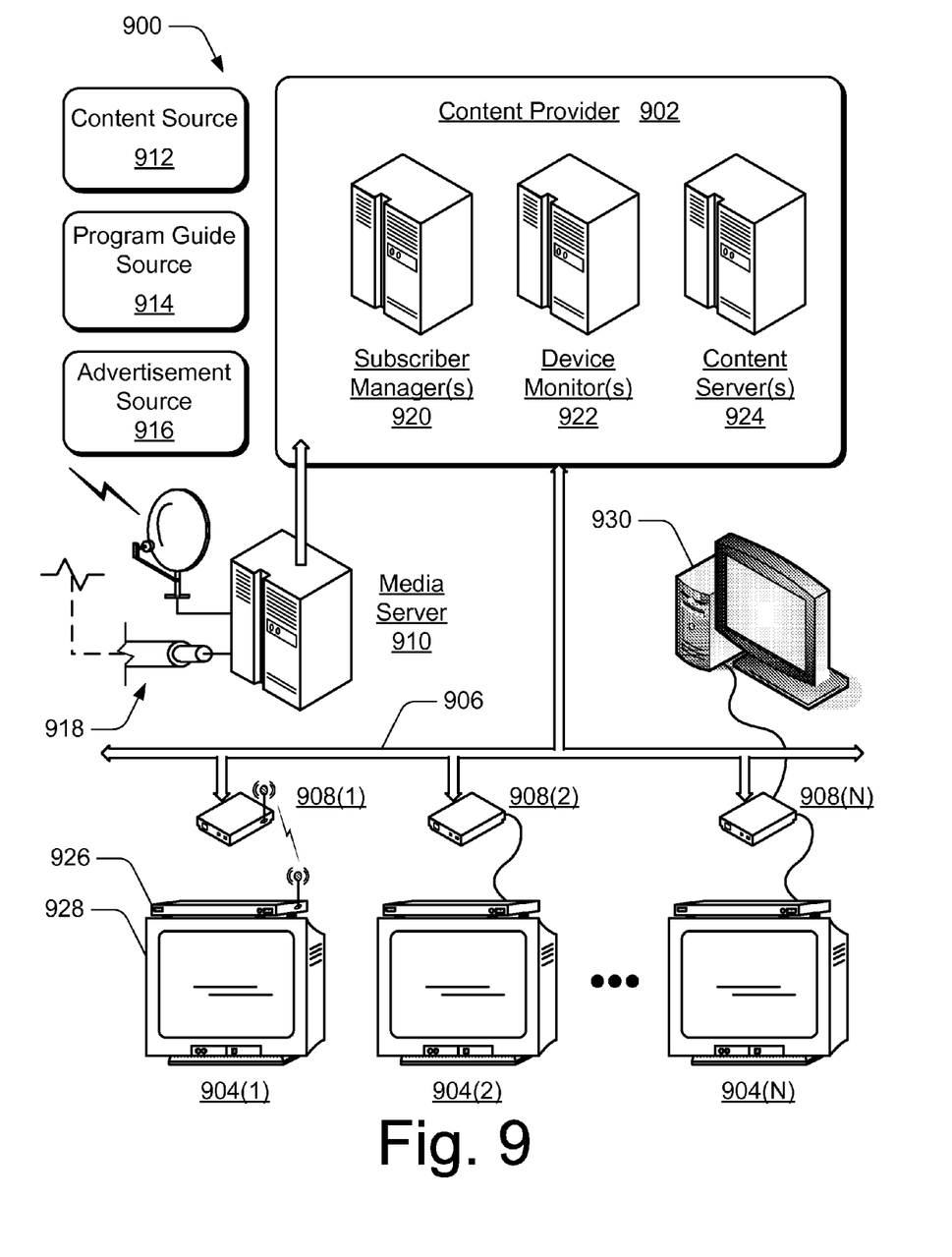
FIG. 9 illustrates various devices and components in an exemplary entertainment and information system in which embodiments of predictive phonetic data search can be implemented.

FIG. 9 illustrates an exemplary entertainment and information system 900 in which an IP-based television environment can be implemented, and in which embodiments of predictive phonetic data search can be implemented. System 900 facilitates the distribution of program content, program guide data, and advertising content to multiple viewers. System 900 includes a content provider 902 and television-based client systems 904(1-M) each configured for communication via an IP-based network 906.

The network 906 can be implemented as a wide area network (e.g., the Internet), an intranet, a Digital Subscriber Line (DSL) network infrastructure, or as a point-to-point coupling infrastructure. Additionally, network 906 can be implemented using any type of network topology and any network communication protocol, and can be represented or otherwise implemented as a combination of two or more networks. A digital network can include various hardwired and/or wireless links 908(1-M, routers, gateways, and so on to facilitate communication between content provider 902 and the client systems 904(1-M). The television-based client systems 904 (1-M receive program content, program guide data, advertising content, closed captions data, and the like from content server(s) of the content provider 902 via the IP-based network 906.

System 900 includes a media server 910 that receives program content from a content source 912, program guide data from a program guide source 914, and advertising content from an advertisement source 916. In an embodiment, the media server 910 represents an acquisition server that receives the audio and video program content from content source 912, an EPG server that receives the program guide data from program guide source 914, and/or an advertising management server that receives the advertising content from the advertisement source 916.

The content source 912, the program guide source 914, and the advertisement source 916 control distribution of the program content, the program guide data, and the advertising content to the media server 910 and/or to other television-based servers. The program content, program guide data, and advertising content is distributed via various transmission media 918, such as satellite transmission, radio frequency transmission, cable transmission, and/or via any number of other transmission media. In this example, media server 910 is shown as an independent component of system 900 that communicates the program content, program guide data, and advertising content to content provider 902. In an alternate implementation, media server 910 can be implemented as a component of content provider 902.

Content provider 902 is representative of a headend service in a television-based content distribution system, for example, that provides the program content, program guide data, and advertising content to multiple subscribers (e.g., the television-based client systems 904(1-1V)). The content provider 902 can be implemented as a satellite operator, a network television operator, a cable operator, and the like to control distribution of program and advertising content, such as movies, television programs, commercials, music, and other audio, video, and/or image content to the client systems 904(1-1V).

Content provider 902 includes various components to facilitate media data processing and content distribution, such as a subscriber manager 920, a device monitor 922, and a content server 924. The subscriber manager 920 manages subscriber data, and the device monitor 922 monitors the client systems 904(1-M (e.g., and the subscribers), and maintains monitored client state information.

Although the various managers, servers, and monitors of content provider 902 (to include the media server 910 in one embodiment) are illustrated and described as distributed, independent components of content provider 902, any one or more of the managers, servers, and monitors can be implemented together as a multi-functional component of content provider 902. Additionally, any one or more of the managers, servers, and monitors described with reference to system 900 can implement features and embodiments of predictive phonetic data search.

The television-based client systems 904(1-M can be implemented to include a client device 926 and a display device 928 (e.g., a television). A client device 926 of a television-based client system 904 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 904(IV) is implemented with a computing device 930 as well as a client device 926. Additionally, any of the client devices 926 of a client system 904 can implement features and embodiments of predictive phonetic data search as described herein.

Although embodiments of predictive phonetic data search have been described in language specific to structural features and/or methods, it is to be understood that the subject of the appended claims is not necessarily limited to the specific features or methods described. Rather, the specific features and methods are disclosed as exemplary implementations of predictive phonetic data search.

What is claimed is:

1. A computer implemented method for input of a character, the method comprising:
   receiving an indication that one or more sequences of keys of a keypad device has been selected;
   determining a plurality of alpha-numeric characters from the one or more sequences of keys to identify a search request, a shape of the plurality of alpha-numeric characters being approximated by the one or more sequences of keys based on a relative location on the keypad of each key in the one or more sequences of keys;
   searching a numeric index to locate a number that matches a numerical equivalent of a term responsive to the search request, the numeric equivalent including additional equivalents associated with phonetic equivalents and misspellings of the term;
   obtaining the term from a term index that is mapped to the number in the numeric index; and
   returning the term in response to the search request.

2. The method of claim 1, wherein the shape of the plurality of alpha-numeric characters is represented by any of a plurality of key sequences.

3. The method of claim 1, further comprising determining a numerical equivalent of the plurality of alpha-numeric characters.

4. The method of claim 3, wherein the numerical equivalent of the characters is a number associated with the character on the keypad.

5. The method of claim 3, further comprising generating a representation of a character string, wherein:
   the character string comprises a plurality of alpha-numeric characters; and
   each particular alpha-numeric character of the plurality of alpha-numeric characters is represented by the numerical equivalent of the particular alpha-numeric character.

6. The method of claim 1, wherein the keypad device comprises a personal digital assistant.

7. The method of claim 1, wherein the keypad device comprises a telephone.

8. The method of claim 1, wherein the keypad device comprises a television remote control.

9. The method of claim 1, wherein a television-based entertainment system is configured to implement the method.

10. One or more computer readable storage media encoded with instructions that, when executed by a processor, direct the processor to perform a method comprising:
    identifying an input comprising a selected sequence of keys of a keypad, the relative locations of the sequence of keys on the keypad representing a shape of a character;
    determining the character having the shape represented by the sequence of keys;
    determining a numerical equivalent of the character; and
    in an event the input comprises a plurality of selected sequences of keys corresponding to a search request:
       concatenating the numerical equivalent of each character having a shape represented by one of the plurality of selected sequences of keys into a numerical equivalent of a character string; and
       returning a term that is mapped to the numerical equivalent of the character string, the term being returned in a language different from a language of the search request.

11. The method of claim 10, wherein the shape of the alpha-numeric character is represented by any of a plurality of key sequences.

12. The method of claim 10, wherein the numerical equivalent of each character is a number associated with a character on the keypad.

13. A system comprising:
    a processor;
    a memory;
    a communication interface configured to receive data from a keypad; and
    a term manager module stored in the memory and executed on the processor, the term manager module configured to:
       convert a sequence of key selections received from the keypad to a character, the relative locations on the keypad of the keys that are selected approximating a shape of the character;
       determine a numerical equivalent of a search request comprising a plurality of characters including the character;
       search a numeric index to locate a number that matches the numerical equivalent of a term responsive to the search request, the numeric equivalent including additional equivalents associated with phonetic equivalents and misspellings of the term;

obtain the term from a term index that is mapped to the number in the numeric index; and return the term in response to the search request, the term manager module further being configured to return the term in a user-selected language different from a language of the search term.

14. The system of claim 13, wherein the term manager module is further configured to:

identify a plurality of key sequences that are input, the plurality of key sequences representing shapes of the plurality of characters;

concatenate each numerical equivalent into the numerical equivalent of the plurality of characters.

15. The system of claim 13, wherein the system is part of a television entertainment system.

16. The system of claim 13, wherein the shape of the alpha-numeric character is represented by any of a plurality of key sequences.

17. The system of claim 13, wherein the numerical equivalent of each character is a number associated with the character on the keypad.

18. The system of claim 13, wherein the keypad device comprises a personal digital assistant.

19. The system of claim 13, wherein the keypad device comprises a telephone.

20. The system of claim 13, wherein the keypad device comprises a television remote control.

* * * * *